(12) United States Patent
Kasamatsu

(10) Patent No.: US 7,729,003 B2
(45) Date of Patent: Jun. 1, 2010

(54) MULTI FUNCTION DEVICE AND PROGRAM THEREFOR

(75) Inventor: Daisuke Kasamatsu, Aichi-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1077 days.

(21) Appl. No.: 11/405,473

(22) Filed: Apr. 18, 2006

(65) Prior Publication Data

US 2006/0232820 A1    Oct. 19, 2006

(30) Foreign Application Priority Data

Apr. 18, 2005    (JP)    ............................. 2005-120396

(51) Int. Cl.
*G06F 15/00* (2006.01)
*G03G 15/20* (2006.01)

(52) U.S. Cl. ........................................ 358/1.16; 399/67

(58) Field of Classification Search ............... 358/1.16, 358/1.15, 1.18, 1.14, 539, 504, 468, 448, 358/534, 296, 404, 444; 399/8, 11, 27, 45, 399/67, 69, 81, 70; 386/95, 117; 400/62, 400/88, 472, 691, 61, 63, 78, 56, 124.03; 712/1, 226; 715/863

See application file for complete search history.

(56) References Cited

U.S. PATENT DOCUMENTS

| 5,898,824 | A | 4/1999 | Kato et al. | |
| 6,906,822 | B1 | 6/2005 | Nohnishi | |
| 6,945,715 | B2 * | 9/2005 | Nakatani et al. | ............... 400/61 |
| 2001/0043347 | A1 * | 11/2001 | Endo et al. | ................. 358/1.11 |
| 2004/0239993 | A1 * | 12/2004 | Urata | ........................ 358/1.16 |
| 2004/0257618 | A1 * | 12/2004 | Wang | ........................ 358/1.17 |

FOREIGN PATENT DOCUMENTS

| JP | 6-258898 A | 9/1994 |
| JP | 6-303405 | 10/1994 |
| JP | 9-139787 A | 5/1997 |

(Continued)

OTHER PUBLICATIONS

Japanese Office Action, with English translation, Japanese Patent Application No. JP 2005-120396, mailed Aug. 28, 2007.

(Continued)

*Primary Examiner*—Saeid Ebrahimi Dehkordy
(74) *Attorney, Agent, or Firm*—Scully, Scott, Murphy & Presser, P.C.

(57) ABSTRACT

An image processing apparatus includes a print mode initializing unit, a print mode modifying unit, a data retaining unit that retains the modified print settings for a predetermined period, a data receiving unit that receives data, a storage unit that stores the data, a data size calculating unit that calculates a size of an available storage area of the storage unit and a size of print data in accordance with the modified print settings when the data receiving unit receives the data when the modified print settings are retained. A comparing unit outputs a signal in response to a condition where the size of print data exceeds the available storage area. A print mode adjustor modifies, in response to the signal, the print settings so that the print data can be stored in the available storage area.

20 Claims, 7 Drawing Sheets

FOREIGN PATENT DOCUMENTS

| | | |
|---|---|---|
| JP | 9-164741 | 6/1997 |
| JP | 2000-270196 | 9/2000 |
| JP | 2001-080140 | 3/2001 |
| JP | 2002-300330 | 10/2002 |
| JP | 2004-351732 | 12/2004 |

OTHER PUBLICATIONS

Japanese Office Action, with English Translation, issued in Japanese Patent Application No. 2005-120396 dated on Nov. 20, 2007.

Chinese Office action Issued in Chinese Patent Application No. CN 200610072461.5 dated on Mar. 7, 2008.

\* cited by examiner

MULTI FUNCTION DEVICE AND PROGRAM THEREFOR

CROSS-REFERENCE TO RELATED APPLICATION

This application claims priority from Japanese Patent Application No. 2005-120396, filed on Apr. 18, 2005, the entire subject matter of the application is incorporated herein by reference.

FIELD OF THE INVENTION

Aspects of the invention relate to an image processing apparatus such as an MFD (Multi Function Device) having at least functions of a printer and a facsimile device.

DESCRIPTION OF RELATED ART

Recently, various types of MFDs have been used. Among such MFDs, there are ones having functions of not only a printer, but a scanner, a copier and a facsimile device. In addition, some MFDs are configured such that a storage medium such as a flash memory can be electrically connected. Such MFDs can print out images in accordance with image data stored in the connected storage medium.

Generally, the MFD is configured such that various printing modes (e.g., sheet type, sheet size, printing resolutions, etc.) can be selected. Typically, the MFD is configured such that a printing mode assumed to be the most frequently used mode is set as its default printing mode. Unless a user changes the default printing mode, the printing operation is executed in accordance with the default printing mode. If the user wishes to perform high-resolution printing (typically when photo-quality printing in accordance with the image data stored in the flash memory or digital camera), a particular sheet type (typically a photo-print sheet) is selected and the print resolution should be set to a high-resolution (e.g., 1200 dpi×2400 dpi). For this purpose, the MFDs are typically configured such that the print mode can be temporarily set to the photo-print mode as described above. Further, some MFDs may be configured that the temporary setting (photo-print mode) is retained for a predetermined period of time. With such a configuration, when, for example, the high-quality printing is performed for a plurality of sheets, the user need not set the print setting for each sheet. Examples of such a configuration are disclosed in Japanese Patent Provisional Publication Nos. HEI 6-258898 and HEI 9-139787.

When the MFD having a facsimile function is executing high-quality (photo-quality) printing (i.e., the temporary setting is retained) and facsimile data is received, the facsimile data is typically stored in a memory of the MFD. Similarly, when the MFD having a scanner function is executing high-quality (photo-quality) printing (i.e., the temporary setting is retained) and image data is received, the image data is stored in the memory of the MFD. In such MFDs, the memory is used as a temporary storage of the facsimile data or image data transmitted from outside.

When the facsimile data or image data is stored in the memory and the high-quality printing proceeds, the print data is stored in the available memory area of the MFD. Since print resolution is high for high-quality printing, the size of the print data is large. Therefore, if the facsimile data or the image data received and stored is relatively large in size, the remaining capacity of the memory may be too small and the print data may not be stored. In such a case, the high-quality printing cannot continue.

The MFD may be configured such that an error message indicating that the high-quality printing is forcibly stopped is generated if the remaining space is determined to be too small. However, if the printing operation is stopped, it is necessary for the user to select the temporary setting of the print mode again. It means that the user must re-execute the same setting operations including the setting of resolution, designating the images to be printed, inputting the number of sheets, and the like. Further, when the printing starts in accordance with the re-set temporary setting, the same condition may recur if facsimile data or image data is received.

SUMMARY OF THE INVENTION

An advantage of the present invention is an improved MFD (Multi Function Device) having a printer function and another function of receiving data from outside and storing the received data in a data storage device thereof, in which print data to be referred to by the print function is also stored. The improved MFD is advantageous in that, even if a print mode is set to a temporary mode and facsimile data or the like is received, the print job can proceed.

According to the present invention, the foregoing and other advantages are achieved in part by an image processing apparatus for printing an image on a recording sheet, comprising an initializing unit configured to initialize print settings, an input unit allowing to modify the print settings initialized by the initializing unit, a retaining unit configured to retain the print settings for a predetermined time, a data receiver configured to receive data, a storage unit configured to store the data, a data size calculator configure to calculate an available storage area of the storage unit and a size of print data in accordance with the modified print settings when the data receiver receives the data under a condition where the modified print settings are retained by the data retaining unit, a comparator that compares the available storage area with the size of print data, the comparator outputting a signal in response to a condition where the size of data exceeds the available storage area, and a print settings adjuster that modifies, in response to the signal, the print settings so that the print data is stored in the available storage area.

Another aspect of the present invention is a computer program product comprising computer readable instructions that cause a computer system to server as an image processing apparatus capable of printing an image on a recording sheet. The instructions cause the computer system to execute the steps to initialize print settings, to allow to modify the initialized print mode, to retain the modified print settings for a predetermined time, to receive data, to store the data, to calculate an available storage area of the storage unit and the size of the print data in accordance with the modified print settings when the data is received under a condition where the modified print settings are retained, to compare the available storage area with the size of print data, the comparing unit outputting a signal in response to a condition where the size of print data exceeds the available storage area, and modify, in response to the signal, the print settings so that the print data is stored in the available storage area.

A still further aspect of the present invention is a method of controlling an image processing apparatus for printing an image on a recording medium. The method includes the steps of: initializing print settings, allowing to modify the initialized print settings, retaining the modified print settings for a predetermined time, receiving data, storing the data, calculating an available storage area of the storage unit and a size of print data in accordance with the modified print settings when the data is received under a condition where the modified print settings are retained, comparing the available storage area with the size of print data, the comparing unit outputting a signal in response to a condition where the size of print data exceeds the available storage area, and modifying, in response to the signal, the print settings so that the s print data is stored in the available storage area.

Additional advantages of the present invention will become readily apparent to those skilled in this art from the following detailed description, wherein only selected embodiments of the present invention are shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to certain embodiments of the invention, there is provided a multi function device for printing an image on a recording sheet. The multi function device includes a print mode initializing unit configured to initialize print mode data defining at least the size of the recording sheet and a print resolution of the image formed on the recording sheet, a print mode modifying unit allowing a user to modify the print mode initialized by the print mode initializing unit, a data retaining unit configured to retain the print mode data modified with the print mode modifying unit for a predetermined period, a data receiving unit configured to receive input data, a storage unit configured to store the input data received by the data receiving unit, a data size calculating unit configure to calculate a remaining capacity of the storage unit and a size of data necessary for printing in accordance with the modified print mode data when the data receiving unit receives the input data and the modified print mode data is retained by the data retaining unit, a comparing unit that compares the remaining capacity of the storage unit with the size of data necessary for printing, the comparing unit outputting a memory shortage signal if the size of data exceeds the remaining capacity of the storage unit, and a print mode adjusting unit that modifies, in response to the memory shortage signal, the print mode data so that the size of data is equal to or less than the remaining capacity of the storage unit.

The print mode adjusting unit can be configured to restore the print mode data to the initial print mode data.

The print mode adjusting unit can be configured to lower the print resolution defined by the print mode data.

The retaining unit can be configured to designate a type of print data which can be retained by the retaining unit.

The multi function device can further include an indicator indicating that the modified print mode data is retained by the retaining unit.

The multi function device can further include a data transfer unit configured to transfer the input data stored in the storage unit to an external storage. The data transfer unit may restore the adjusted print mode data to the modified print mode data.

The data transfer unit can include a detecting unit configured to detect whether the external storage is connected to the multi function device. In this embodiment, the data transfer unit transfers the input data stored in the storage unit to the external storage when the external storage is connected to the multi function device.

According to certain embodiments of the invention, there is provided a computer program product including computer readable instructions that cause a computer system to serve as a multi function device for printing an image on a recording sheet. The instructions cause the computer system to execute the steps to initialize print mode data defining at least a size of the recording sheet and a print resolution of the image formed on the recording sheet, to allow a user to modify the initialized print mode, retain the modified print mode data for a predetermined period, receive input data, store the input data, calculate a remaining capacity of the storage unit and a size of data necessary for printing in accordance with the modified print mode data when the input data is received and the modified print mode data is retained, compare the remaining capacity of the storage unit with the size of data necessary for printing, the comparing unit outputting a memory shortage signal if the size of data exceeds the remaining capacity of the storage unit, and modify, in response to the memory shortage signal, the print mode data so that the size of data is equal to or less than the remaining capacity of the storage unit.

The step to adjust the print mode data can restore the print mode data to the initial data.

The step to adjust the print mode data can lower the print resolution defined by the print mode data.

The step to retain can designate a type of print data which can be retained.

The instructions can further include a step to control an indicator of the multi function device to indicate that the modified print mode data is retained.

The instructions can further include a step to transfer the input data to an external storage, wherein the step to transfer the input data restores the adjusted print mode data to the modified print mode data.

The step to transfer can may include a step to detect whether the external storage is connected to the multi function device. The step to transfer the data can transfer the input data stored in the storage unit to the external storage when the external storage is detected as being connected to the multi function device.

According to aspects of the invention, there is provided a method of controlling a multi function device for printing an image on a recording sheet. The method includes the steps of initializing print mode data defining at least a size of the recording sheet and a print resolution of the image formed on the recording sheet, allowing a user to modify the initialized print mode, retaining the modified print mode data for a predetermined period, receiving input data, storing the input data, calculating a remaining capacity of the storage unit and a size of data necessary for printing in accordance with the modified print mode data when the input data is received and the modified print mode data is retained, comparing the remaining capacity of the storage unit with the size of data necessary for printing, the comparing unit outputting a memory shortage signal if the size of data exceeds the remaining capacity of the storage unit, and modifying, in response to the memory shortage signal, the print mode data so that the size of data is equal to or less than the remaining capacity of the storage unit.

The step of adjusting the print mode data can restore the print mode data to the initial print mode data.

The step of adjusting the print mode data can lower the print resolution defined by the print mode data.

The step of retaining can designate a type of print data which can be retained.

The method can further include a step of controlling an indicator of the multi function device to indicate that the modified print mode data is retained.

The method can further include a step of transferring the input data to an external storage. The step of transferring the input data can restore the adjusted print mode data to the modified print mode data.

Referring to the accompanying drawings, illustrative embodiments according to aspects of the invention will be described in detail.

First Embodiment

Figure 1:
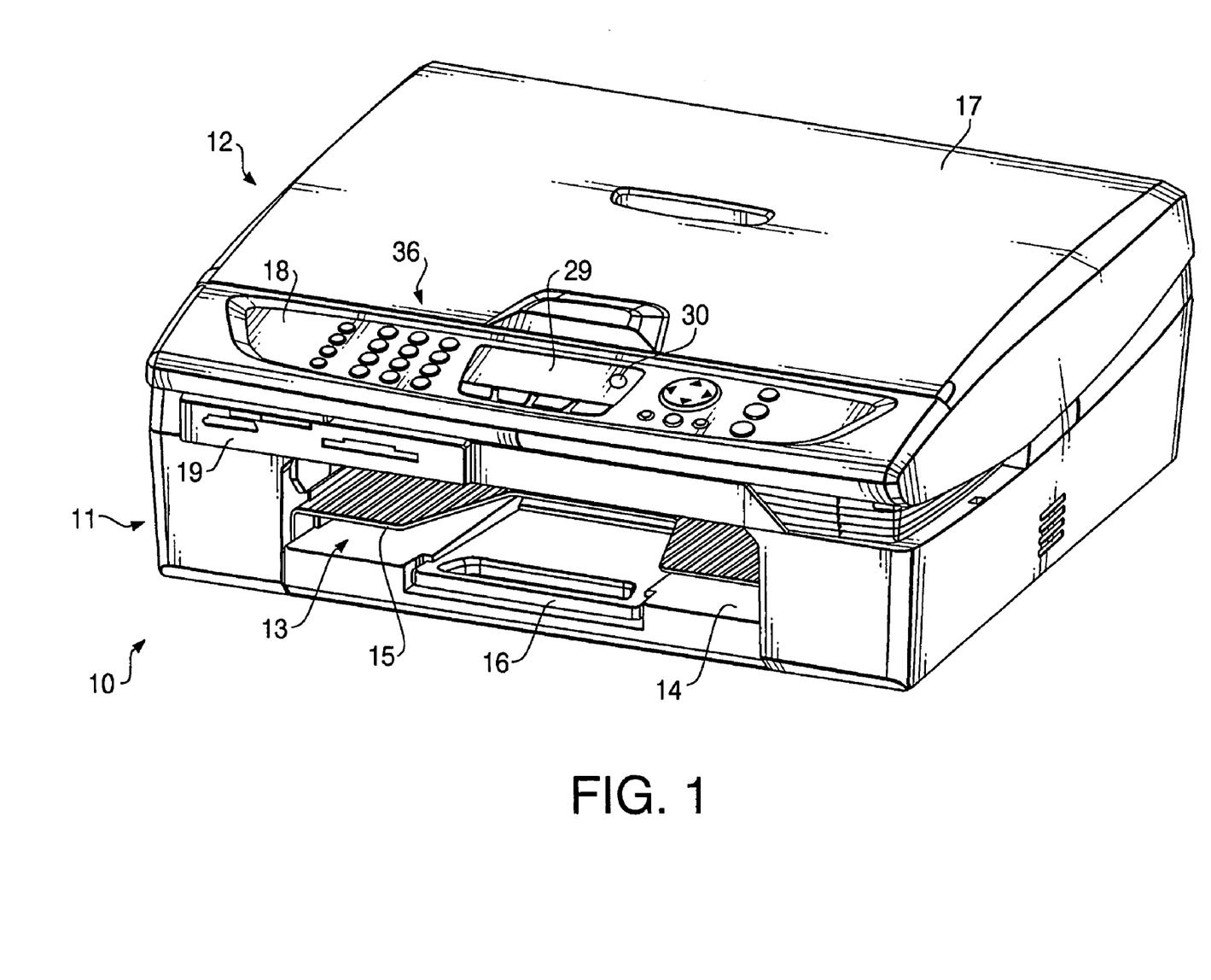
FIG. 1 is a perspective view of an MFD according to the present invention.

FIG. 1 is a perspective view of an MFD (Multi Function Device) 10 according to a first embodiment of the present invention.

The MFD 10 is a device having a plurality of functions. Specifically, the MFD 10 includes integrally provided printer unit 11, communication unit (not shown) and scanner unit 12. The printer unit 11 and the communication unit are provided on a lower part of the MFD 10, while a scanner unit 12 is provided on an upper part thereof. The printer unit 11 is, for example, an inkjet printer. In such a case, the MFD 10 can be a relatively small device. The MFD 10 can have a plurality of sheet feed cassettes and/or an ADF (Auto Document Feeder). Optionally, the MFD 10 can be connected with a computer (not shown) and is configured to print images in accordance with image data and/or text data transmitted from the computer or to store such data received from the computer. Further, the MFD 10 is connectable to a digital camera to print/store image data output by the digital camera. Furthermore, the MFD 10 can be configured such that various types of recording media can be connected and image data stored in the recording media can be printed on recording sheets.

As shown in FIG. 1, the MFD 10 has a shape of a wide and thin rectangular solid. In this illustrative embodiment, the MFD 10 is configured such that the width and depth are larger than the height, and width is larger than the depth. The lower part of the MFD 10 has the printer 11 unit. The printer unit 11 has an opening 13 on a front surface. A sheet feed tray 14 and a sheet discharge tray 15 are arranged one above the other, and are exposed to outside through the opening 13. The sheet feed tray 14 is for holding the recording sheets. According to the illustrative embodiment, the sheet feed tray 14 can contain the recording sheets whose size is A4 or smaller (e.g., B5, postcard etc.). The sheet feed tray 14 is provided with a slide tray 16. When necessary, the slide tray 16 is drawn out so that a tray surface is enlarged. The recording sheets accommodated in the sheet feed tray 14 are transferred inside the printer unit 11, images are formed thereon inside the printer unit 11, and discharged onto the discharge tray 15.

On the upper part of the MFD 10, the scanner unit 12 is provided. The scanner unit 12 in this illustrative embodiment is a flat bed scanner. The MFD 10 is provided with an original sheet cover 17, which can be opened/closed with respect to the body of the MFD 10. Below the original sheet cover 17, a platen glass (not shown) and an image scanner are provided. When an image formed on an original is scanned, the original is placed on the platen glass. The image scanner is provided below the platen glass, and scans the image on the original placed on the platen glass. According to the illustrative embodiment, the image is configured to move in a width direction of the MFD 10, which is a main scanning direction. It should be noted that the image scanner extends in a direction (depth direction) which is perpendicular to the main scanning direction. Thus, when the image scanner moves in the main scanning direction, a two-dimensional area of the original placed on the platen glass can be scanned by moving the image sensor once.

On an upper front surface of the MFD 10, an operation panel 18 is provided. The operation panel 18 is for operating the printer unit 11 or the scanner unit 12, and for receiving image data from an external device such as the flash memory or digital camera. In the lower portion of the MFD 10, a control unit that controls operations of the printer unit 11 and the scanner unit 12, and the entire operation of the MFD 10, is accommodated.

The MFD 10 operates in accordance with instructions which are transmitted from the computer via the printer driver or issued by the operation of the operation panel by the user. The operation panel 18 is provided with various operation buttons 36, an LCD (Liquid Crystal Display) unit 29, and a setting holding LED (Light Emitting Diode) 30. As the operation buttons 36 are operated, the printer unit 11 is operated, and, for example, the print mode data is set (i.e., the temporary set is done). The print mode data includes parameters for determining how the printing is performed by the printer unit 11. The print mode data includes at least the print resolution and sheet size (e.g., postcard, A4, or the like).

According to the illustrative embodiment, the print mode data is automatically set to its initial data (default data) by the control unit. The print mode data includes the print resolution and sheet size, as described before, and further, the sheet type (e.g., glossy sheet or normal sheet), the number of sheets to be printed, and image determining data. The "image determining data" represents information designating an image to be printed from among the images, for example, stored in the digital camera. Exemplary initial data may represent: 600 dpi×600 dpi (resolution); A4 size (sheet size); normal sheet (sheet type); one (the number of sheets); and the image data firstly displayed on the LCD unit 29 (the image determining data).

On an upper left portion of the front surface of the MFD 10, a slot portion 19 is defined. Various types of small memory cards can be inserted in the slot portion 19. When such a small memory card is inserted in the slot portion 19, image data stored therein can be retrieved therefrom. The retrieved image data is displayed on the LCD unit 29. Then, if the user operates the operation panel 18, the images stored in the small memory card can be designated and printed by the printer unit 11. It should be noted that, if the operation buttons 36 are operated to designate the images, only the designated images are printed.

Figure 2:
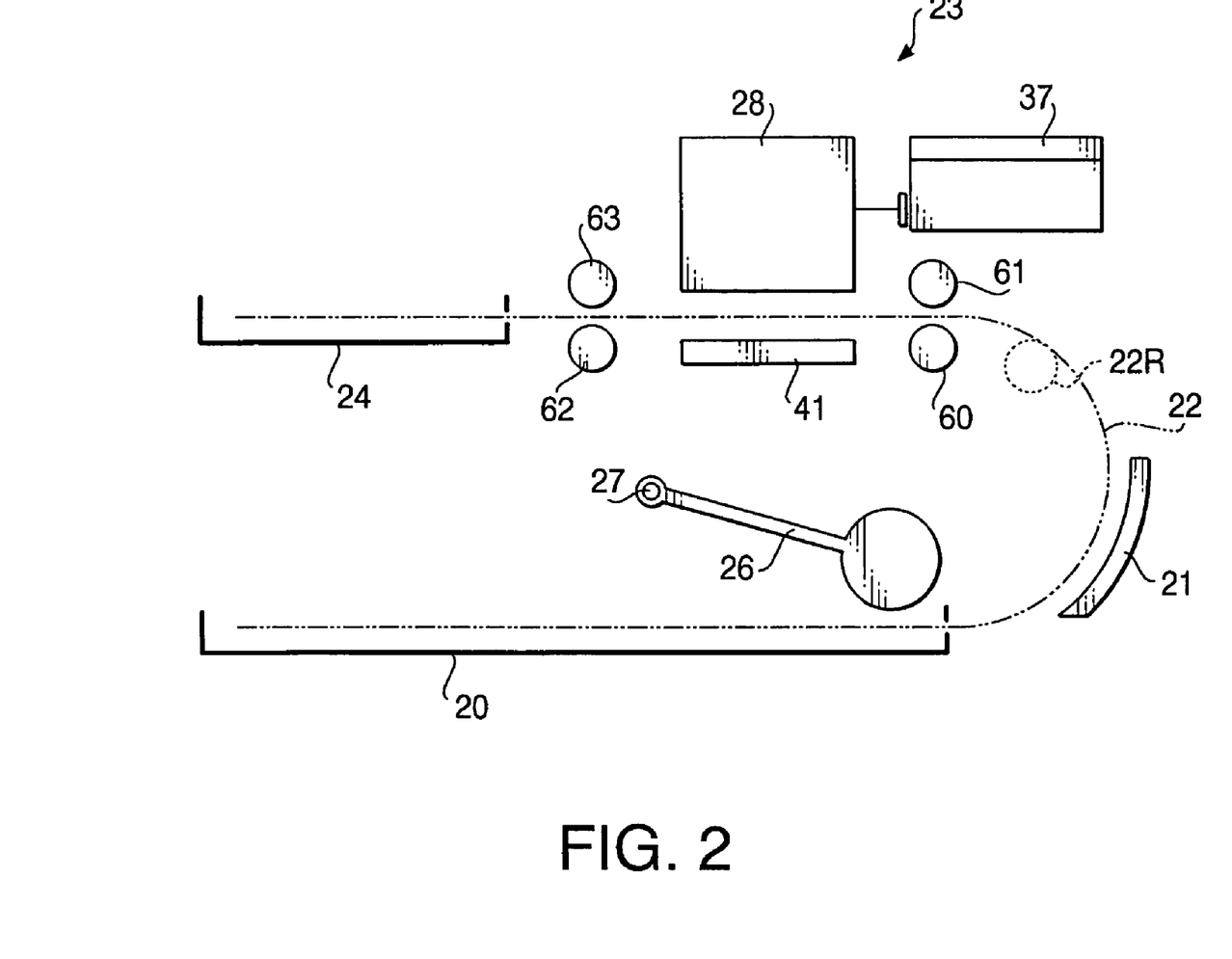
FIG. 2 schematically shows a structure of a printer unit of the MFD according to the present invention.

FIG. 2 schematically shows the structure of the printer unit 11 of the MFD 10. A direction perpendicular to a plane of FIG. 2 is the main scanning direction (i.e., the width direction of the MFD 10).

As shown in FIG. 2, the sheet feed tray 20 is provided at a bottom of the MFD 10. On a rear side (right-hand side in FIG. 2) of the tray 20, a separation plate 21 that separates the stacked recording sheets and guides the recording sheet upward is provided. A sheet feed path 22 is thus defined from the separation plate 21 to the upward direction. The feed path further extends in a left-hand direction (from the rear side to the front side of the MFD 10), passing through the recording unit 23 and directed to the discharge tray 24. Accordingly, the recording sheet accommodated in the sheet feed tray 20 makes a U-turn, guided by the separation plate 21, and reaches the recording unit 23. Then, after an image is formed on the recording sheet by the recording unit 23, the recording sheet is discharged into the discharge tray 24. The direction in which the recording sheet proceeds along the feed path 22 is the sheet feed direction, which is perpendicular to the main scanning direction.

Above the sheet feed tray 20, a feed roller 25 is provided. The feed roller feeds the recording sheets stacked on the sheet feed tray 20 one by one to the sheet feed path 22. The feed roller 25 has a well-known structure. For example, the feed roller 25 is provided at a distal end of a sheet feed arm 26 which is rotatably supported by a shaft 27. As shown in FIG. 2, the sheet feed arm 26 can be moved away and toward the sheet feed tray 20 so that feed roller 25 contacts the top of the stacked recording sheets regardless of the amount of the recording sheets. The feed roller 25 is connected to a motor (not shown) through a driving force transmitting mechanism, which includes a plurality of gears. As the motor rotates, the driving force is transmitted to the sheet feed roller 25 and rotates the same.

The feed arm 26 is rotatable about the shaft 27 so that the feed arm 26 is rockable in an up-and-down direction in FIG. 2. Specifically, the feed arm 26 is, when in a standby state, spaced apart from the feed tray by a clutch and a spring upward (not shown), and is moved downward to contact the sheet when the recording sheets are fed. When the feed arm 26 rocks downward, the sheet feed roller 25 is press-contacted with the upper surface of the stacked recording sheets. As the sheet feed roller 25 rotates in such a state, by the frictional force between the surface of the sheet feed roller 25 and the recording sheet, the top sheet is fed to the sheet feed path 22. It should be noted that, when the top sheet is fed, the sheet immediately below the top sheet may be fed together due to the frictional or electrostatic force. According to the illustrative embodiment, such a sheet, which is unintentionally fed, is blocked as it contacts the separation plate 21.

The sheet feed path 22 is configured such that, except at the portion where the recording unit 23 is provided, the path is defined by an external guide surface and an internal guide surface. In the MFD 10 according to the illustrative embodiment, the external guide surface is formed on an inner surface of the frame of the MFD 10, while the internal guide surface is formed by the surface of a guide member provided in the frame of the MFD 10. At a portion where the sheet feed path 22 is curved, a feed support roller 22R may be provided. The feed support roller 22R has its rotational shaft extending in the main scanning direction (i.e., the width direction of the sheet feed path 22: a direction perpendicular to a plane of FIG. 2). The feed support roller 22R can be provided such that it circumferential surface is exposed from the internal guide surface or from the external guide surface. As the feed support roller is provided, even at the curved portion of the sheet feed path 22, the recording sheet contacts and is fed smoothly along the internal/external guide surfaces.

On a downstream side of the curved portion of the sheet feed path 22, the recording unit 23 is provided. If an inkjet printer is employed in the printer unit 11, the recording unit 23 includes the inkjet head unit 28 (which will be referred to as a head unit 28, hereinafter). A platen 41 is provided facing the head unit 28 with the sheet feed path 22 therebetween. The head unit 28 can include a cartridge type ink tank 37, from which the ink is supplied. The head unit 28 is mounted on a carriage (not shown), which is slid by a CR (carriage) motor in the main scanning direction. The position and the sliding movement of the head; unit 28 are monitored using a carriage encoder (not shown). The head unit 28 forms an image as it is driven to slide and ejects the ink. It should be noted that the head unit 28 can employ a conventional inkjet printing system.

On the upstream side of the recording unit 23, a driving roller 60 and a press roller 61 are provided. the driving roller 60 and the press roller 61 nip the recording sheet fed along the sheet feed path 22 therebetween, and feed the same onto the platen 41. As mentioned above, feeding of the recording sheet is controlled in accordance with the output of the sheet feed encoder (not shown). Further, a registration sensor (not shown) is provided at a predetermined position along the sheet feed path 22 so as to detect that the recording sheet is located at the predetermined position. Furthermore, as shown in FIG. 2, on the downstream side of the recording unit 23, a discharge roller 62 and a press roller 63 are provided, which nip the recording sheet on which the image has been formed therebetween and feed the same. The driving roller 60 is driven to rotate by an LF (Line Feed) motor, and the discharge roller 62 is also driven by the LF motor. Therefore, the recording sheet is fed intermittently at a predetermined line-feed pitch.

The press roller 61 is urged toward the driving roller 60 by a predetermined pressure. Thus, when the recording sheet enters the nip between the driving roller 60 and the press roller 61, the press roller 61 slightly (by an amount corresponding to the thickness of the recording sheet) retracts from the driving roller elastically. As a result, the press roller 61 and the driving roller 60 cooperate to feed the recording sheet. With this configuration, it is ensured that the rotational force is transmitted to the recording sheet. The relationship between the press roller 63 and the discharge roller 62 is the same. It should be pointed out that, since the press roller 62 contacts the recording sheet on a surface carrying the formed image, it is preferable that the press roller 63 has a spur-like cross section taken along a plane perpendicular to its rotational axis.

The recording sheet nipped between the driving roller 60 and the press roller 61 is intermittently (at every predetermined amount) fed on the platen 41. The head unit 28 is slid in the head moving direction at every line feed of the recording sheet so that the image is formed from the leading end side of the recording sheet to the trailing end thereof. The recording sheet on which the image has been formed is nipped between the discharge roller 62 and the press roller 63. In other words, the recording sheet is fed intermittently by a predetermined line-feed amount at every feeding movement, being nipped between the discharge roller 62 and the press roller 63, and between the driving roller 60 and the press roller 61, while the head unit 28 forms the image on the recording sheet synchronously with the intermittent movement of the recording sheet.

When the recording sheet is further fed, and the trailing end passes through the nip between the driving roller 60 and the press roller 61, the recording sheet is fed only by the driving force applied thereto at the nip between the discharge roller 62 and the press roller 63. The recording sheet is still fed intermittently, and the head unit 28 keeps forming the image on the recording sheet. After the image is formed within a predetermined area on the recording sheet, the discharge roller 62 is continuously driven to rotate so that the recording sheet nipped between the discharge roller 62 and the press roller 63 is discharged to the discharge tray 24.

Figure 3:
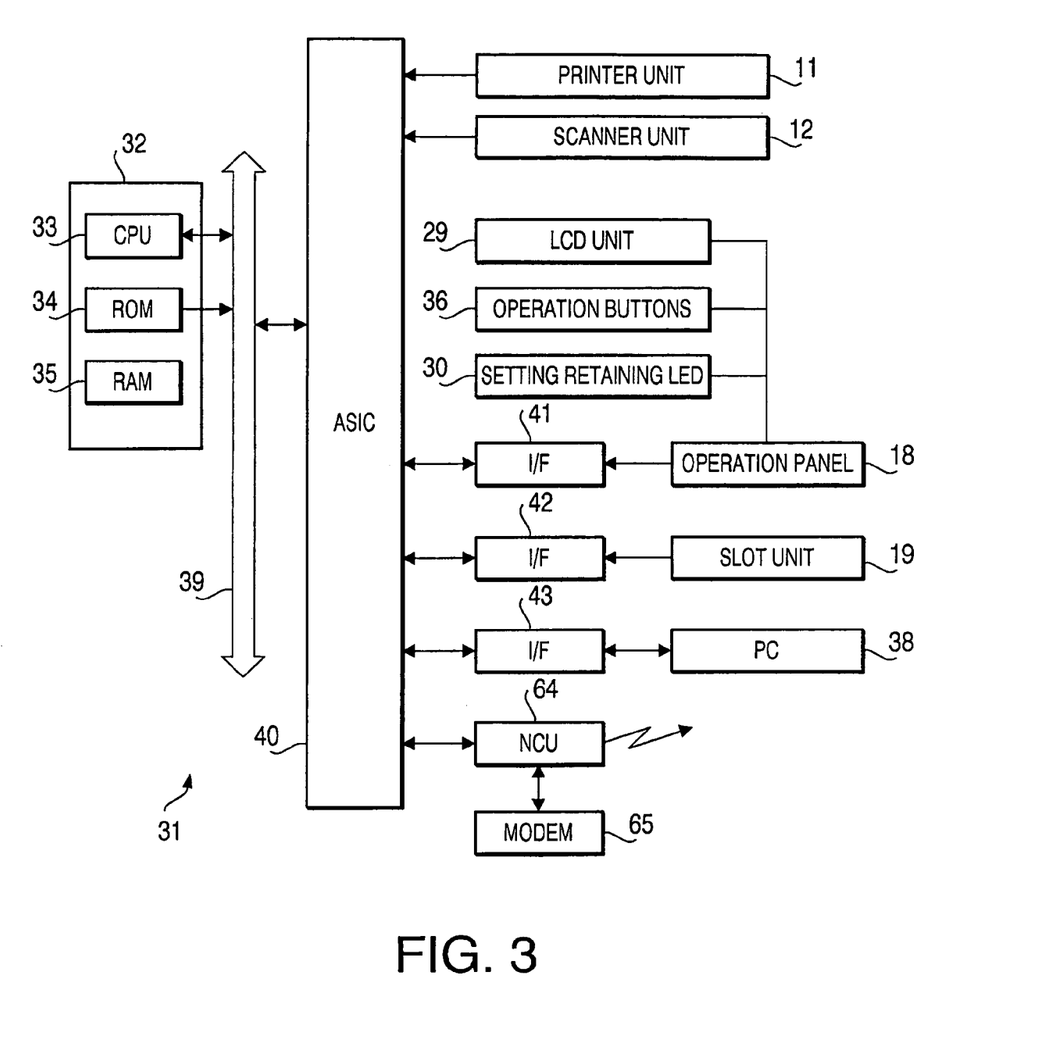
FIG. 3 is a block diagram of a control system of the MFD according to the present invention.

FIG. 3 is a block diagram of the control unit 31 of the MFD 10.

As shown in FIG. 3, the control unit 31 includes a processing unit 32. The processing unit 32 includes a CPU (Central Processing Unit) 33, a ROM (Read Only Memory) 34 and a RAM (Random Access Memory) 35. The processing unit 32 is connected, via a bus 39 and an ASIC (Application Specific Integrated Circuit) 40, to various sensors (e.g., the register sensor, the sheet feed encoder, the carriage encoder), the printer unit 11, the scanner unit 12 and the operation panel 18.

The ROM 34 stores various programs for controlling various operations of the MFD 10. The RAM 35 provides a storage area for temporarily storing data for executing the programs and work areas therefor. The ASIC 40 outputs signals for driving the LF motor, CR motor and the like in accordance with instructions issued by the CPU 33, thereby controlling the operations of the printer unit 11 and the scanner unit 12.

The CPU 33 reads the programs stored in the ROM 34 and temporarily stores the same in the RAM 35. Then, the CPU 33 sets the print mode data to the initial values in accordance with the program. The set print mode data is stored in the RAM 35.

By operating the operation buttons 36 of the operation panel 18, the user can set the print mode data, which has initial values, to any desired values (i.e., a temporary setting can be achieved). For example, the user can change the print resolution, sheet size and the number of sheets to be printed, etc. When the temporary setting of the print mode data is made, the print mode data stored in the RAM 35 is rewritten.

The CPU 33 holds the print mode data for a predetermined period of time. That is, if the print mode data is changed from its default values, the CPU 33 stores the changed print mode data in the RAM 35 for the predetermined period. In the illustrative embodiment, the "predetermined period" is within a range of one minute to five minutes. The effects of the temporary change will be described later.

The ASIC 40 is connected with the operation panel 18, the personal computer 38 and the slot unit 19, through interfaces (I/F) 41, 42 and 43, as well as the printer unit 11 and the scanner unit 12. Thus, based on the image data and/or text data transmitted by the personal computer 38, images and/or texts can be recorded on the recording sheets. To the operation panel 18, the setting holding LED 30 is connected. If the temporary setting is effected by the operation switches 36 or the personal computer 38, the setting holding LED 30 is lit to indicate that the temporary setting is retained.

Further, the ASIC 40 is connected with an NCU (Network Control Unit) 64 and a MODEM 65. The NCU 64 and the MODEM 65 are used to receive a facsimile transmission. Specifically, when the NCU 64 and the MODEM 65 receive facsimile data from an external device, the NCU 64 temporarily stores the received facsimile data in the RAM 35. The CPU 33 functions to convert the facsimile data into print data in accordance with the program therefor, feeds the recording sheet and drives the print head 28 to form the image. As a result, the transmitted facsimile data is printed on the recording sheet. It should be noted that the facsimile data is once stored in the RAM 35 and then printed. Alternatively, the facsimile data is received in response to a user's demand and printed. Further alternatively, the facsimile data is output to a memory of the personal computer 38 connected to the MFD 10.

The CPU 33 calculates necessary data size for executing printing based on the temporary set print mode data and the remaining capacity of the RAM 35, when the facsimile data is received in accordance with the program. In this case, the "data size for executing the printing" is calculated by the CPU 33 based on, inter alia, the temporary set print mode data, the print resolution and sheet size stored in the RAM 35. Whether the temporary setting is retained is determined by the CPU 33 based on whether the predetermined period has passed since the operation switches 36 were operated and the modified print mode data was stored in the RAM 35. Whether the facsimile was received is determined by the CPU 33 based on whether the NCU 64 communicated with the external device.

The CPU 33 temporarily stores the remaining capacity and the calculated data size in the RAM 35, and compares them with each other. If the calculated data size exceeds the remaining capacity, the CPU 33 outputs a memory shortage signal, which is stored in the RAM 35.

If the memory shortage signal is stored in the RAM 35, the CPU 33 modifies the print mode data in accordance with the program. Specifically, the CPU 33 modifies the print mode data (which is the temporary set print mode data) stored in the RAM 35 and stores the modified print mode data. In a modification process, the CPU 33 modifies the print mode data such that the data size is equal to or less than the remaining capacity.

Figure 4:
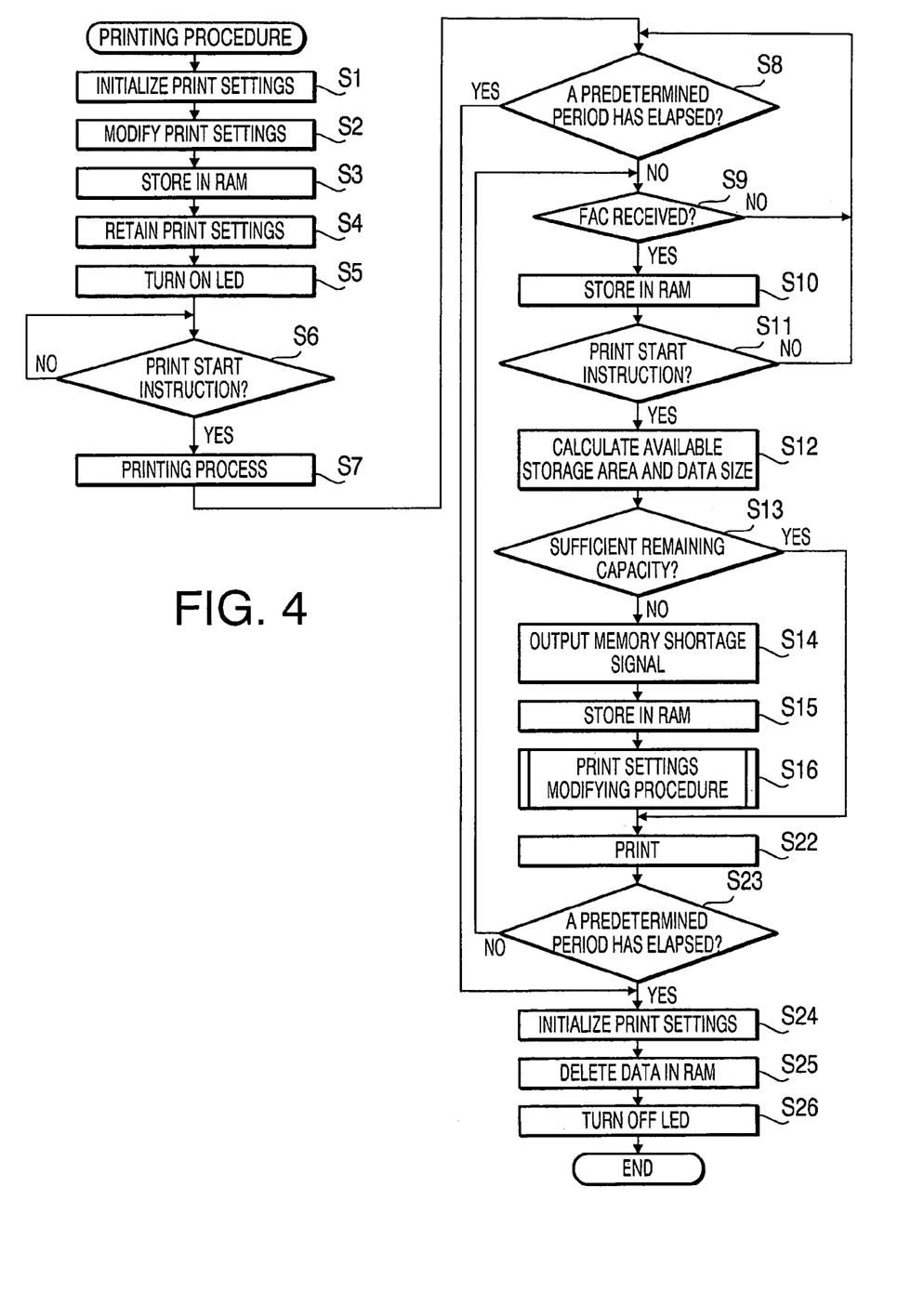
FIG. 4 shows a flowchart illustrating a printing procedure according to a first embodiment of the invention.

FIG. 4 is a flowchart illustrating a printing procedure executed by the MFD 10 according to an illustrative embodiment of the present invention.

According to the MFD 10, the print mode data is set to its initial data (S1). The CPU 33 stores, in accordance with the program, the initial data in the RAM 35. The "initial data" is determined as follows: the print resolution is 600 dpi×600 dpi; the sheet size is A4; the sheet type is normal; and the number of sheet to be printed is one. Therefore, if an original image is scanned by the scanner unit 12, the image of the original is stored in the RAM 35 temporarily, and the CPU 33 generates the print data for printing the image and stores the print data in the RAM 35. Then, the CPU 33 controls the operation of the printer unit 11 to print the image. If the data storage medium such as a flash memory is inserted in the slot unit 19, the image stored in the data storage medium is printed, and the images stored in the data storage medium are displayed on the LCD unit 29. Specifically, the image data stored in the data storage medium is temporarily stored in the RAM 35, the CPU 33 generates data to display the images on the LCD unit 29 in accordance with the program, and stores the thus generated data in the RAM 35. Then, the CPU 33 displays the images on the LCD unit 29 based on the thus generated data. The user can select any one of the images displayed on the LCD unit 29 by operating the operation buttons 36. The selected image is printed as described above.

If photo-quality printing is executed based on image data stored in the flash memory or a memory of a digital camera, the user can change the print resolution to, for example, 1200 dpi×2400 dpi by operating the operation buttons 36 (S2). Specifically, when the print resolution is designated through the operation buttons 36, the CPU 33 modifies the print resolution of the print mode data set to the initial data in accordance with the program, and stores the modified print resolution data in the RAM 35 (S3). It should be noted that the print mode data to be modified need not be limited to the print resolution, but can be any other parameter, including the sheet size and the like.

The modified print mode data is retained for the predetermined period of time as the temporary setting (S4). Specifically, the CPU 33 stores the temporarily set print mode data in the RAM 35 for the predetermined period of time. When the temporarily set print mode data is held, the setting holding LED 30 is lit (S5) as the CPU 33 outputs the signal for actuating the setting holding LED 30.

In S6, the CPU 33 judges whether the MFD 10 has received the print start instruction, with the print mode being set to the temporary setting. If the print start instruction is received (S6: YES), the CPU 33 executes the printing operation (S7). When the user operates the operation panel 18 to start printing, the print start information is stored in the RAM 35. Based on the print start information, the CPU 33 controls the printer unit 11 as described above, and controls the MFD 10 to execute the printing procedure (S7). As the temporary setting is retained, the printing procedure can be repeated with the retained print mode. Thus, the user need not modify the print mode data for every sheet, if the printing is to be executed on a plurality of recording sheets with the same print mode data. Further, after the predetermined period has elapsed, the print mode data is restored automatically to the initial print mode data. Therefore, after printing in accordance with the temporary setting, the user need not operate the operation panel 18 to restore the initial setting of the print mode data.

After the printing job is finished, the CPU 33 judges whether the predetermined period has elapsed (S8). That is, the CPU 33 judges whether the temporary setting is retained. Specifically, the CPU 33 judges whether the predetermined period has elapsed since the temporary setting was stored in the RAM 35. If the predetermined period has elapsed (S23: YES), the print mode data is restored (i.e., set to the initial value) in S24. Specifically, the CPU 33 changes the temporary set print mode data to the initial data, and stores the same in the RAM 35.

Even if the temporary setting is retained, facsimile data can be received. The CPU 33 judges whether the NCU 64 receives facsimile data (S9). If the NCU 64 receives facsimile data, the CPU 33 stores facsimile data in the RAM 35 (S10). The RAM 35 is a temporary storage and work area of data, and various data for controlling the operation of the MFD 10 is also stored in the RAM 35. Therefore, if the facsimile data is stored in the RAM 35, the storage area for the data for controlling the MFD 10 is reduced (i.e., the remaining capacity of the RAM 35 is reduced). In particular, when the size of the facsimile data is large, the remaining capacity of the RAM 35 is reduced significantly.

Even if the facsimile data is stored in the RAM 35, the user can operate the operation panel 18 and transmit a print job command to the MFD 10. That is, in S11, the CPU 33 judges whether the print start command is input through the operation panel 1 (S11).

When the temporary setting is retained, if the print start command is issued, the remaining capacity of the RAM 35 is calculated, and the data size for printing is calculated based on the temporarily set print mode data (S12). It should be noted that the "data size for executing printing" is unambiguously calculated based on the print resolution and the size of the recording sheet.

Further, the CPU 33 compares the remaining capacity with the data size for printing (S13). If the data size for printing is larger than the remaining capacity (S13: NO), the CPU 33 outputs the memory shortage signal (S14). The memory shortage signal is temporarily stored in the RAM 35 (S15). When the memory shortage signal is stored in the RAM 35, the CPU 33 adjusts the print mode data so that the size of the data necessary for printing is equal to or less than the remaining capacity (S16). Typically, the CPU 33 changes the print mode data so that the print resolution is reduced.

Figure 5:
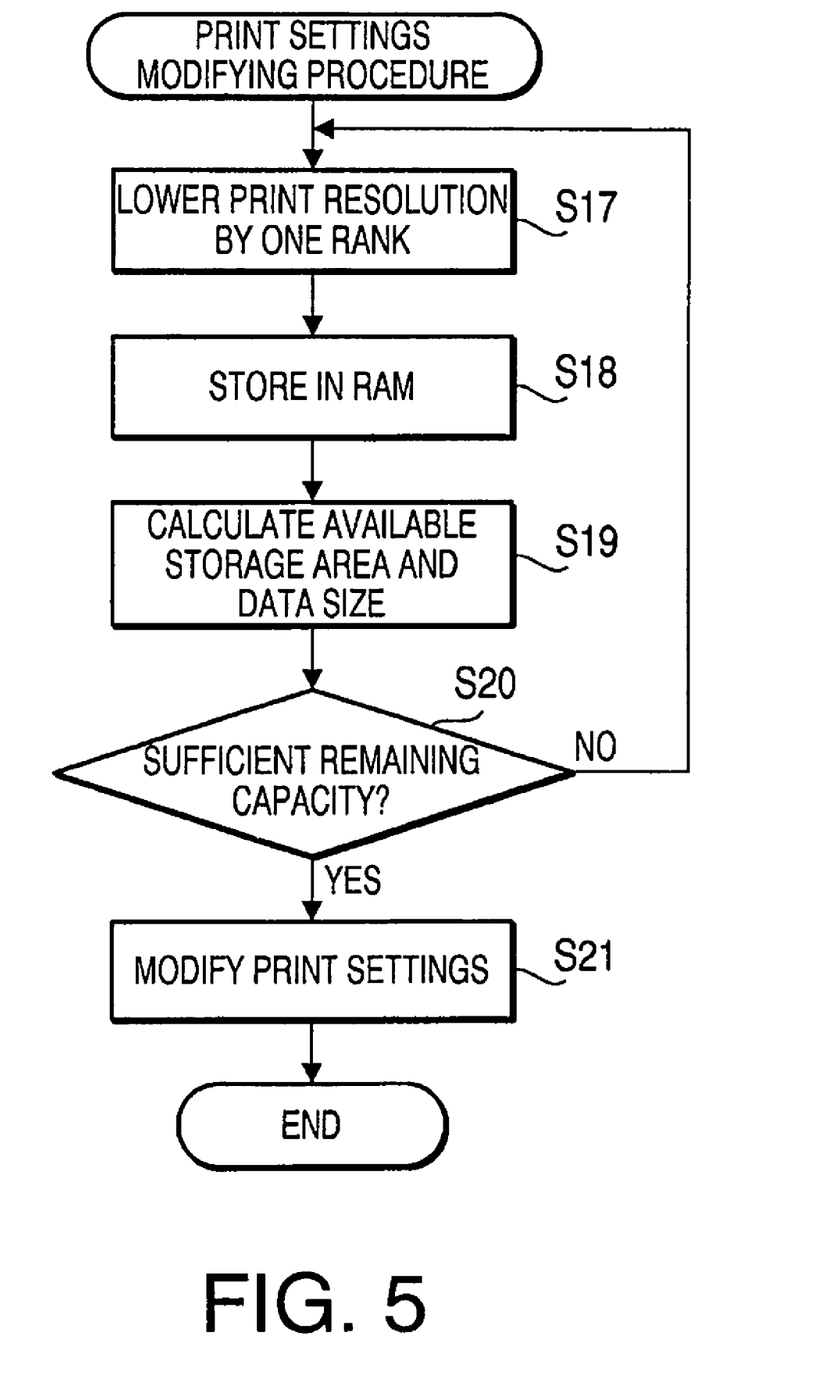
FIG. 5 shows a flowchart illustrating a print mode data modifying procedure according to the first embodiment of the invention.

FIG. 5 shows a flowchart illustrating the print mode data adjusting procedure which is called in S16 of the printing procedure.

When the memory shortage signal is stored in the RAM 35, the CPU 33 lowers the print resolution by one rank (one step). According to the illustrative embodiment, the print resolution is set to one of four resolutions: 2400 dpi; 1200 dpi; 600 dpi; and 300 dpi. Thus, when the current print resolution is 2400 dpi, it is changed to 1200 dpi as the CPU 33 lowers the print resolution by one step (S17). The lowered print resolution is stored in the RAM 35 (S18).

With the print resolution lowered by one step, the CPU 33 calculates the remaining capacity of the RAM 35 and the size of the data necessary for printing (S19). It should be noted that the size of the data necessary for printing is calculated in accordance with the lowered print resolution and the sheet size. Then, the CPU 33 compares the remaining capacity with the size of the data necessary for printing (S20). If the size of the data necessary for printing still exceeds the remaining capacity (S20: NO), the CPU 33 further lowers the print resolution by one step (S17). Thus, by repeating the steps S17-S20, the CPU 33 determines the print resolution such that the most vivid image can be printed within the remaining capacity of the RAM 35, and stores the thus determined print resolution in the RAM 35. That is, the print mode data stored in the RAM 35 is rewritten (S21), thereby completing the adjustment of the print mode data.

After modifying the print mode data as above, the CPU 33 continues the printing operation (S22). Specifically, the CPU 33 controls the printer unit in accordance with the program under the current print mode. It should be noted that if the size of the data necessary for printing is smaller than the remaining capacity of the RAM 35, the adjustment of the print mode data is not executed, and the printing is continued (S22).

When the print job is finished, the CPU 33 judges again whether the predetermined period has passed (S23), that is, the CPU 33 judges whether the temporary setting is retained. According to the illustrative embodiment, the CPU 33 judges whether the predetermined period has passed since the temporary setting was stored in the RAM 35. If the predetermined period has elapsed (S23: YES), the CPU 33 restores the initial print mode data (S24). Specifically, the CPU 33 rewrites the print mode data to the initial data, and then stores the same in the RAM 35. Further, the CPU 33 deletes the print data in the RAM 35 (S25), and turns off the setting holding LED 30. If the predetermined period has not elapsed since the temporary setting was made (S23: NO), the steps S9 through S23 will be repeated.

When a relatively high print resolution is set in the temporary setting, and facsimile data is received and the remaining capacity of the RAM 35 becomes too small, the print mode data is modified in accordance with the remaining capacity of the RAM 35. Therefore forcible termination of the print job will not occur, and the user need not re-set the print mode and restart the print job. It should be noted that the MFD 10 according to the illustrative embodiment is not intended to perform high-resolution printing. Thus, the MFD 10 is not implemented with a large capacity memory (RAM), which lowers the manufacturing cost of the MFD 10.

According to the illustrative embodiment described above, when the remaining capacity of the RAM 35 is too small, the print resolution is lowered stepwise. The CPU 33 can be configured to restore the print mode data to its initial data. Alternatively, the CPU 33 can be configured to lower the print resolution continuously (non-stepwise) so that the size of the print data is equal to or less than the remaining capacity of the RAM 35. Then, the most vivid image which can be provided with the remaining capacity of the RAM 35 is realized.

The CPU 33 can also be configured such that a particular type of print mode data which can be retained is designated. That is, according to the illustrative embodiment, the CPU 33 is configured to retain only the print resolution and the sheet size, and the parameters such as the selected image data, data representing the number of sheets to be printed, etc. are excluded from the data to be retained. Such data is considered to be set by the user every time the printing is performed. Therefore, such data will not be retained even if modified from the initial data, and is set to the initial data when the print job is finished. Therefore, the part of the print mode data which could be set by respective users arbitrarily can always be changed with respect to the initial data. Accordingly, the user can change the print mode data with less trouble, since the change is always made to the initial value.

According to the above-described illustrative embodiment, a setting holding LED 30 is provided (see FIG. 1). Therefore, the user can recognize whether the temporary setting is available. Since the availability of the temporary setting can be recognized easily, the user can know if the currently set print mode is not an unintended one in advance, and the printing operation in such an unintended print mode can be avoided.

Second Embodiment

Figure 6:
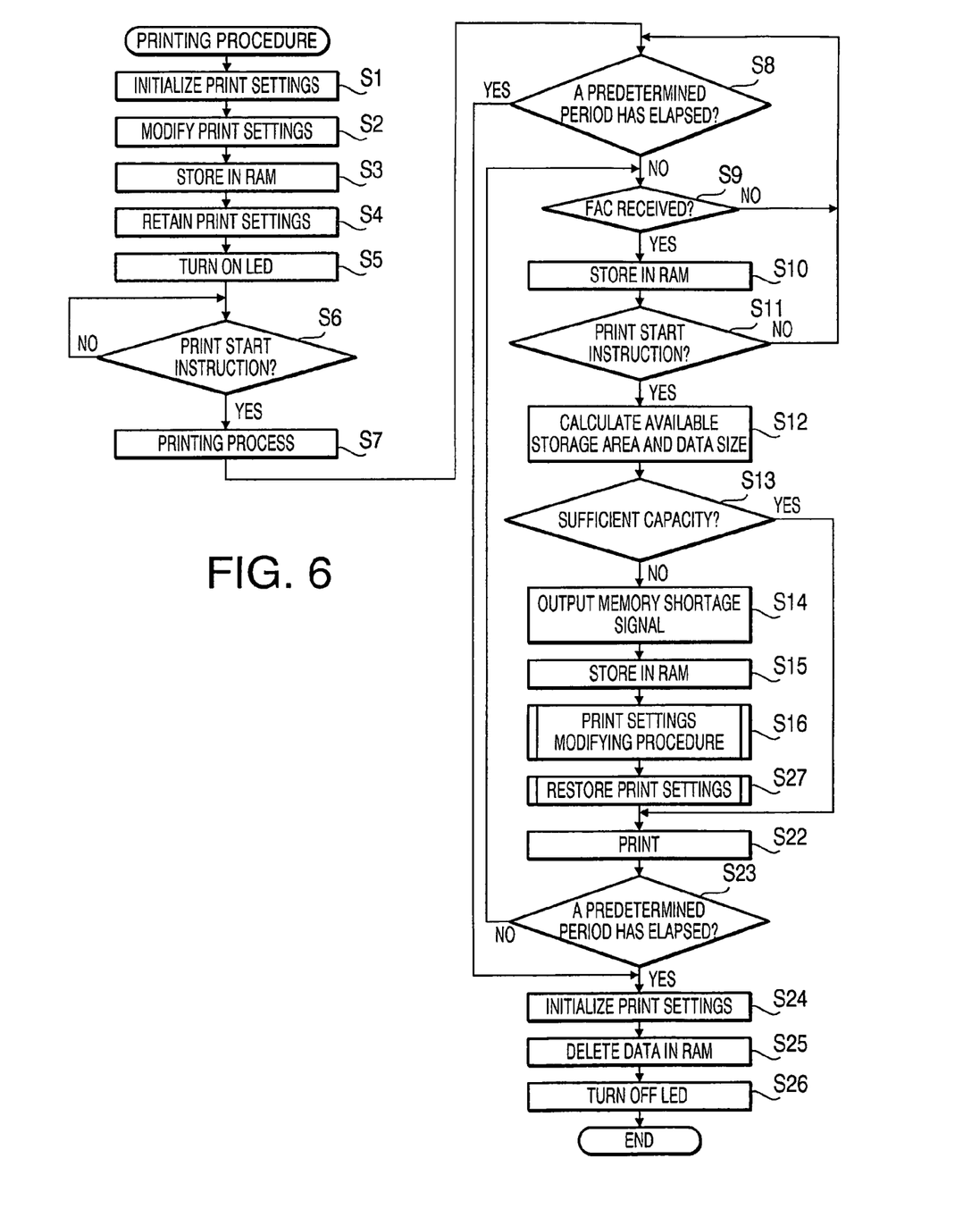
FIG. 6 shows a flowchart illustrating a printing procedure according to a second embodiment of the invention.

FIG. 6 shows a flowchart illustrating the printing procedure according to a second illustrative embodiment of the present invention.

The printing procedure shown in FIG. 6 is substantially the same as that shown in FIG. 4 except that, in FIG. 6, step S27 is added after S16. According to the second embodiment, after the print mode data is adjusted, if a predetermined condition is satisfied, the print mode data is restored to the temporary data before the adjustment has been made. Specifically, according to the second embodiment, even when the remaining capacity of the RAM 35 is relatively small (S14) and the print mode data has been adjusted (S16), if an external storage, for example, the personal computer 38 provided with a storage device such as an HDD (Hard Disk Drive) or the like is connected to the MFD 10, the facsimile data temporarily stored in the RAM 35 is transferred to the storage device of the personal computer 38. After the facsimile data has been transferred to the personal computer 38, if a sufficient capacity of the RAM 35 results, the print mode data once adjusted (S16) is restored to the temporarily set print mode data.

Figure 7:
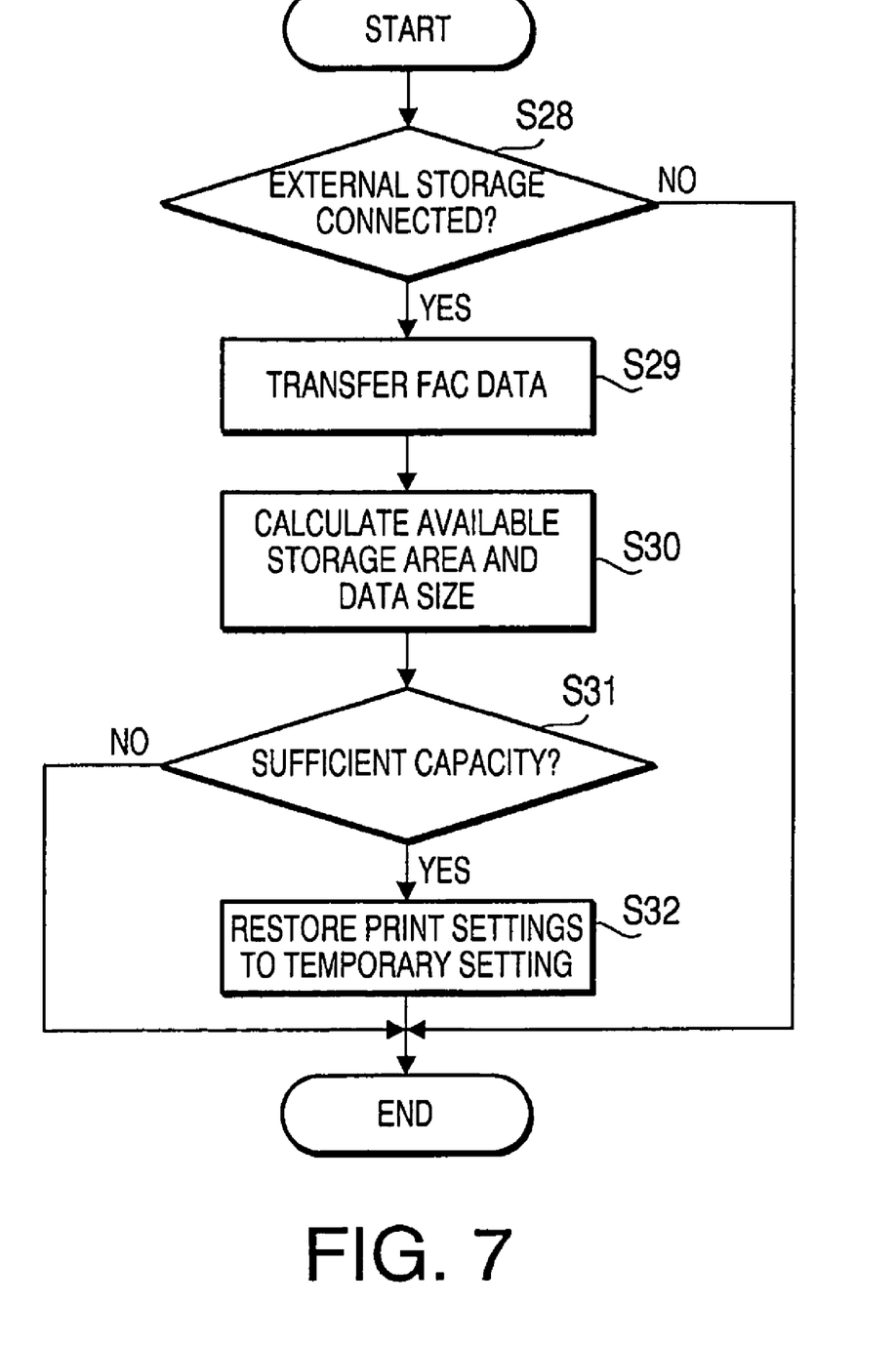
FIG. 7 shows a flowchart illustrating a print mode restoration procedure according to the second embodiment of the invention.

FIG. 7 shows a flowchart illustrating the restoration procedure for restoring the print mode data to the original temporarily set print mode data.

After the print mode data has been adjusted (FIG. 6: S16), the restoration procedure shown in FIG. 7 is called (FIG. 6: S17). In this procedure, the CPU 33 judges whether the personal computer 38 is connected to the slot unit 19 of the MFD 10 (S28).

If the personal computer 38 is connected to the MFD 10 (S28: YES), the facsimile data stored in the RAM 35 is transferred to the HDD or the like of the personal computer 38 (S29). The facsimile data temporarily stored in the RAM 35 is deleted after it is transferred to the HDD of the personal computer 38.

Thereafter, the CPU 33 calculates the remaining capacity of the RAM 35, and the size of the data necessary for printing on the assumption that the print mode data has not been adjusted and the original temporary setting is retained (S30). It should be noted that the size of the data necessary for printing is unambiguously calculated based on the temporarily set print resolution and the sheet size, as aforementioned.

Next, the CPU 33 compares the remaining capacity with the size of the data necessary for printing (S31). If the size of print data exceeds the remaining capacity (S31: NO), as shown in FIG. 6, the printing job is executed under the adjusted print mode (FIG. 6: S22). If the size of the size of print data is equal to or less than the remaining capacity, the print mode data is restored to the temporarily set print mode data (S32). Specifically, the CPU 33 deletes the print mode data (which has been adjusted) stored in the RAM 35, and writes the original temporarily set data (S32).

According to the above-described second embodiment, since the facsimile data temporarily stored in the RAM 35 is transferred to the personal computer 38 (i.e., HDD or the like) connected externally to the MFD 10, the storage area of the RAM 35 is increased. Therefore, even if the temporarily set print mode data is retained, the RAM 35 may temporarily store the print data even if the print resolution remains high, and the printing operation can be continued.

In the above-described embodiments, the facsimile data is referred to as data input externally. It should be noted that the data need not be limited to facsimile data. For example, the data includes image data which can be retrieved from the flash memory or digital camera connected to the slot unit 19 (see FIG. 1).

In the above-described second embodiment, the personal computer 38 (i.e., the HDD thereof) is referred to as external storage, and the input data is transferred to the external storage. It should be noted that the external storage need not be limited to the personal computer 38, but various kinds of recording media and devices (e.g., the memory card inserted in the slot unit 19) can be used as the external storage according to aspects of the invention.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. An image processing apparatus for printing an image on a recording medium, comprising:

an initializing unit configured to initialize print settings;
an input unit allowing modification of the print settings initialized by the initializing unit;
a retaining unit configured to retain the print settings for a predetermined time;
a data receiver configured to receive data;
a storage unit configured to store the data;
a data size calculator configured to calculate an available storage area and a size of print data in accordance with the modified print settings when the data receiver receives the data under a condition where the modified print settings are retained by the data retaining unit;
a comparator that compares the available storage area with the size of print data, the comparator outputting a signal in response to a condition where the size of data exceeds the available storage area; and
a print settings adjuster that modifies, in response to the signal, the print settings so that the print data is stored in the available storage area of the storage unit.

2. The image processing apparatus according to claim 1, wherein the print settings adjuster is configured to restore the print settings to the initial settings.

3. The image processing apparatus according to claim 1, wherein the print settings adjuster is configured to lower the print resolution defined by the print settings.

4. The image processing apparatus according to claim 1, wherein the retaining unit is configured to designate a type of print data which can be retained by the retaining unit.

5. The image processing apparatus according to claim 1, further including an indicator indicating that the modified print settings are retained by the retaining unit.

6. The image processing apparatus according to claim 1, further including a data transfer unit configured to transfer the data stored in the storage unit to an external storage, the data transfer unit restoring the adjusted print settings to the modified print settings.

7. The image processing apparatus according to claim 6, wherein the data transfer unit includes a detector configured to detect whether the external storage is connected to the image processing apparatus, the data transfer unit transferring the data stored in the storage unit to the external storage when the external storage is connected to the image processing apparatus.

8. A computer readable medium having computer readable instructions that cause a computer system to serve as an image processing apparatus capable of printing an image on a recording medium, the instructions causing the computer system to execute the steps to:
   initialize print settings;
   allow to modify the initialized print settings;
   retain the modified print settings for a predetermined time;
   receive data;
   store the data;
   calculate an available storage area of a storage unit and a size of print data in accordance with the print settings when the data is received under a condition where the modified print settings are retained;
   compare the available storage area of the storage unit with the size of the print data;
   outputting a signal in response to a condition where the size of data exceeds the available storage area; and
   modify, in response to the memory shortage signal, the print settings so that the print data is stored in the available storage area.

9. The computer readable medium according to claim 8, wherein the step to adjust the print settings restores the print settings to the initial settings.

10. The computer readable medium according to claim 8, wherein the step to adjust the print settings lowers the print resolution defined by the print mode data.

11. The computer readable medium according to claim 8, wherein the step to retain designates a type of print data which can be retained.

12. The computer readable medium according to claim 8, wherein the instructions further include a step to control an indicator provided to the image processing apparatus to indicate that the modified print settings are retained.

13. The computer readable medium according to claim 8, wherein the instructions further include a step to transfer the data to an external storage, the step to transfer the data restores the adjusted print settings to the modified print settings.

14. The computer readable medium according to claim 13, wherein the step to transfer data includes a step to detect whether the external storage is connected to the image processing apparatus, the step to transfer the data transferring the data stored in the storage unit to the external storage when the external storage is detected to be connected to the image processing apparatus.

15. A method of controlling an image processing apparatus capable of printing an image on a recording medium, the method including the steps of:
   initializing print settings;
   allowing to modify the initialized print settings;
   retaining the modified print settings for a predetermined time;
   receiving data;
   storing the data;
   calculating an available storage area of a storage unit and a size of print data in accordance with the modified print settings when the data is received under a condition where the modified print settings are retained;
   comparing the available storage area with the size of print data; the comparing unit
   outputting a signal in response to a condition where the size of data exceeds the available storage area of the storage unit; and
   modifying, in response to the signal, the print settings so that the print data is stored in the available storage area of the storage unit.

16. The method according to claim 15, wherein the step of adjusting the print settings restores the print settings to the initial settings.

17. The method according to claim 15, wherein the step of adjusting the print settings lowers the print resolution defined by the print settings.

18. The method according to claim 15, wherein the step of retaining designates a type of print data which can be retained.

19. The method according to claim 15, further including a step of controlling an indicator provided to the image processing apparatus to indicate that the modified print settings are retained.

20. The method according to claim 15, further including a step of transferring the data to an external storage, the step of transferring the data restoring the adjusted print settings to the modified print settings.

* * * * *